(12) United States Patent
Powell

(10) Patent No.: US 6,595,379 B1
(45) Date of Patent: Jul. 22, 2003

(54) LOCK FOR PREVENTING INADVERTENT REMOVAL OF A FIRST FRAME COMPONENT OF AN ADJUSTABLE STORAGE SYSTEM FROM A SECOND FRAME COMPONENT OF THE ADJUSTABLE STORAGE SYSTEM AND THE ADJUSTABLE STORAGE SYSTEM

(75) Inventor: Michael Powell, East Stroudsburg, PA (US)

(73) Assignee: United Steel Enterprises, Inc., East Stroudsburg, PA (US)

( * ) Notice: Subject to any disclaimer, the term of this patent is extended or adjusted under 35 U.S.C. 154(b) by 0 days.

(21) Appl. No.: 10/062,640

(22) Filed: Feb. 1, 2002

(51) Int. Cl.7 .............................. A47B 43/00; F16B 9/00
(52) U.S. Cl. ............. 211/192; 248/221.11; 248/221.12; 403/321; 403/327
(58) Field of Search ................................ 211/191, 192; 248/220.22, 221.12, 221.11, 219.1; 403/255, 254, 247, 324, 327, 326, 321; 70/DIG. 19, DIG. 20, 81; 292/60, 175

(56) References Cited

U.S. PATENT DOCUMENTS 2,422,693 A * 6/1947 McArthur .................... 70/455

* cited by examiner

Primary Examiner—Daniel P. Stodola
Assistant Examiner—Erica B Harris
(74) Attorney, Agent, or Firm—Charles E. Baxley

(57) ABSTRACT

A lock for preventing inadvertent removal of a first frame component from a second frame component of an adjustable storage system. The lock includes a housing having a distal end extending into the first frame component, a shaft having a proximal end and a distal end and being movable between an extended position and a retracted position relative to the housing, with the distal end thereof extending into the second frame component when the shaft is in the extended position and not extending into the second frame component when the shaft is in the retracted position, a head being slender and elongated, joined to the proximal end of the shaft, and extending radially outwardly therefrom, radially outwardly through the housing, when the shaft is in the extended position and the retracted position, and a spring joined between the head and the housing and biasing the shaft into the extended position.

82 Claims, 13 Drawing Sheets

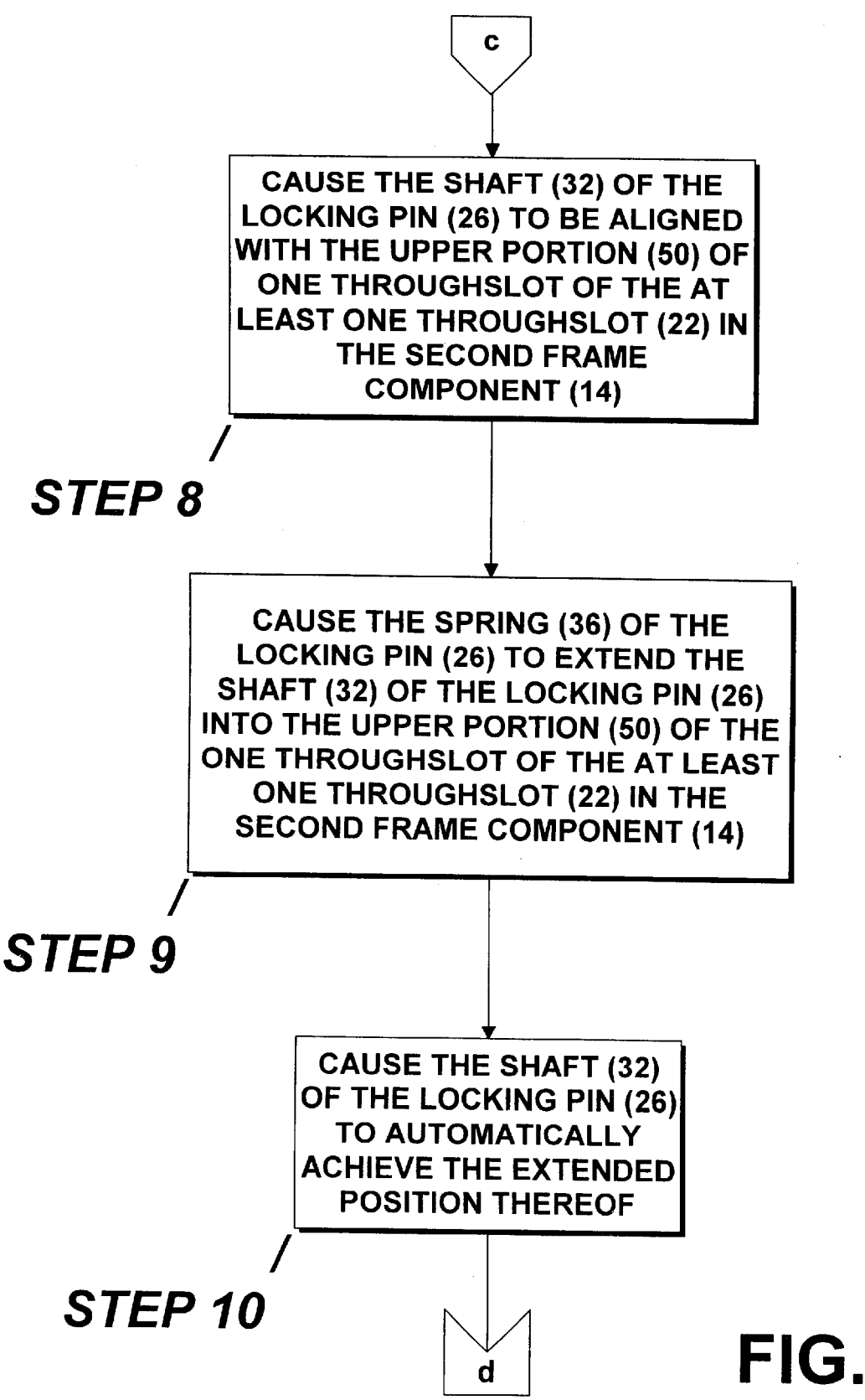

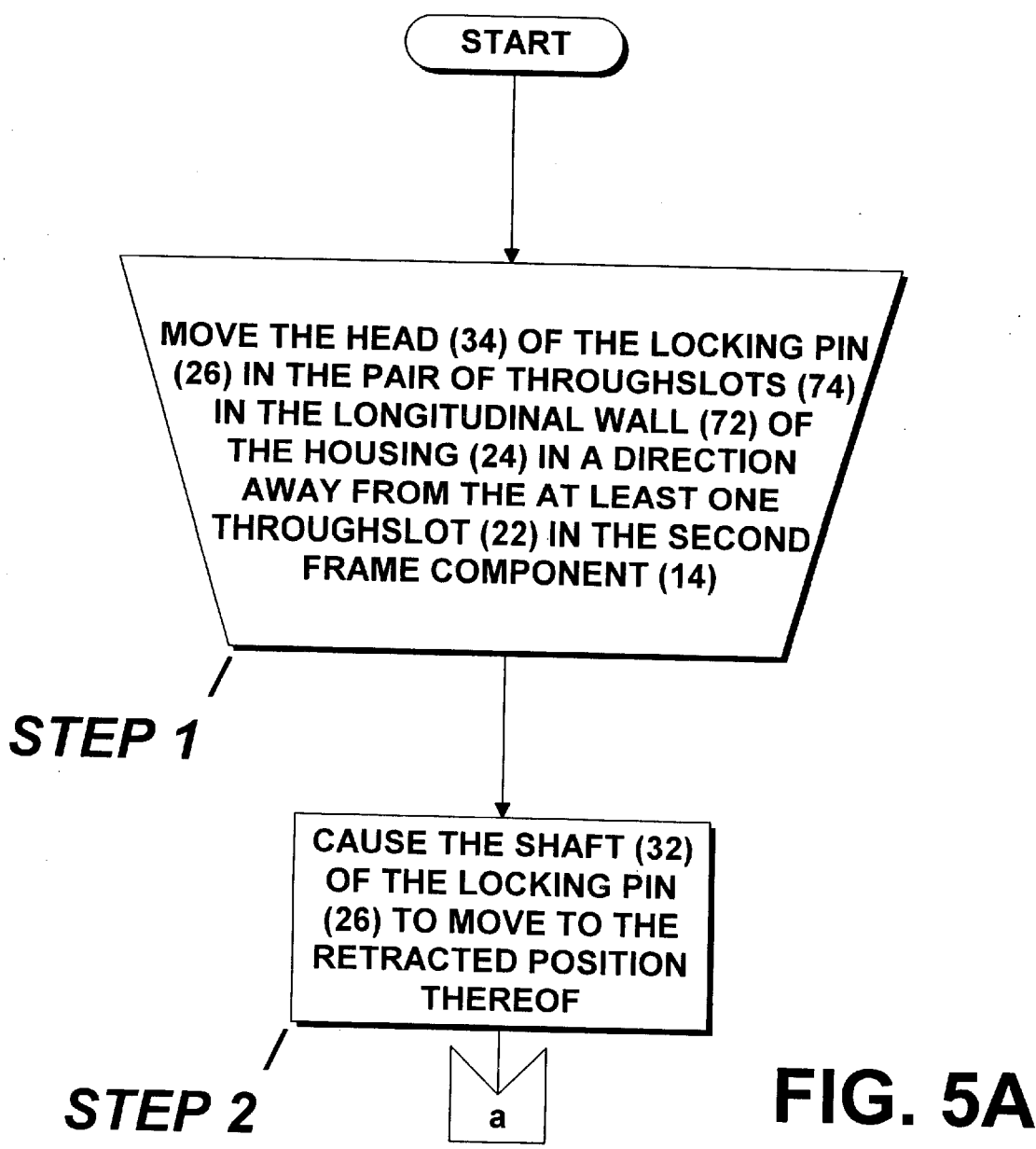

LOCK FOR PREVENTING INADVERTENT REMOVAL OF A FIRST FRAME COMPONENT OF AN ADJUSTABLE STORAGE SYSTEM FROM A SECOND FRAME COMPONENT OF THE ADJUSTABLE STORAGE SYSTEM AND THE ADJUSTABLE STORAGE SYSTEM

BACKGROUND OF THE INVENTION

1. Field of the Invention

The present invention relates to a lock for an adjustable storage system. More particularly, the present invention relates to a lock for preventing inadvertent removal of a first frame component of an adjustable storage system from a second frame component of the adjustable storage system and the adjustable storage system.

2. Description of the Prior Art

In a conventional modular frame system there are vertical support members or columns that interconnect with horizontal support members or beams. The columns have vertical vertically extending rows of slots and the beams have spaced apart pins that insert into the slots in the upright columns.

The beam is connected to the column by first inserting the pins into upper portions of the slots and then sliding the pins downward into lower portions of the slots. When the beam is so connected, a portion of the pin projects beyond the slot to secure the beam from axially disengaging from the upright column, i.e., the beam can only be disconnected by reversing the connection sequence.

Once the beam is connected to the column by inserting the pins into the upper portions of the slots and sliding them into the lower portions of the slots, the beam will remain secured to the column so long as there is a downward force on the pins. There are situations, however, where the beam can accidentally become disengaged from the column. For instance, if a person or machine exerts a lifting force on the beam greater than the load on the beam, the pins will slide upward and the beam can accidentally disengage from the column. During unexpected motion of the modular frame system caused by an object striking the frame or the frame being subjected to vibrational loads, it is possible that the beam will move vertically relative to the column and become disengaged.

To prevent inadvertent disengagement of the beam from the column, it is therefore desirable to lock the beam in place once the pins have been installed into the lower portions of the slots. Thus, there exists a need for a lock that facilitates releasably locking the pins against vertical movement after they have been installed into the lower portions of the slots, which is automatic, i.e., connection of the beam to the column by installation of the pins into the lower openings of the slots automatically actuates the lock, which requires no tools to disengage the lock, and which is readily adaptable for use with conventional modular frame components.

Innovations for adjustable storage systems have been provided in the prior art. Even though these innovations may be suitable for the specific individual purposes to which they address, however, they differ from the present invention.

FOR EXAMPLE, U.S. Pat. No. 5,938,367 and 6,203,234 to Olson teach an automatic lock mechanism for locking adjustable frame system components together. The locking mechanism includes a locking pin having a shaft, a head, and a biasing spring that cooperates with a stud and slot locking mechanism. A stud is inserted into a slot, for example, a teardrop shaped slot, and then moved downward to the direction of insertion. The locking pin then extends into the slot preventing inadvertent upward movement of a horizontal member.

It is apparent that innovations for adjustable storage systems have been provided in the prior art that are adapted to be used. Even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a lock for preventing inadvertent removal of a first frame component of an adjustable storage system from a second frame component of the adjustable storage system and the adjustable storage system that avoids the disadvantages of the prior art.

ANOTHER OBJECT of the present invention is to provide a lock for preventing inadvertent removal of a first frame component of an adjustable storage system from a second frame component of the adjustable storage system and the adjustable storage system that is simple to use.

BRIEFLY STATED, STILL ANOTHER OBJECT of the present invention is to provide a lock for preventing inadvertent removal of a first frame component from a second frame component of an adjustable storage system. The lock includes a housing having a distal end extending into the first frame component, a shaft having a proximal end and a distal end and movable between an extended position and a retracted position relative to the housing, with the distal end thereof extending into the second frame component when the shaft is in the extended position and not extending into the second frame component when the shaft is in the retracted position, a head being slender and elongated, joined to the proximal end of the shaft, and extending radially outwardly therefrom, radially outwardly through the housing, when the shaft is in the extended position and the retracted position, and a spring joined between the head and the housing and biasing the shaft into the extended position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIGS. 4A–4F are a process flow chart of the manner of linking and locking the first frame component to the second frame component of the adjustable storage system of the present invention shown in FIG. 1; and FIGS. 5A–5D are a process flow chart of the manner of unlocking and unlinking the first frame component from the second frame component of the adjustable storage system of the present invention shown in FIG. 1.

Figure 1:
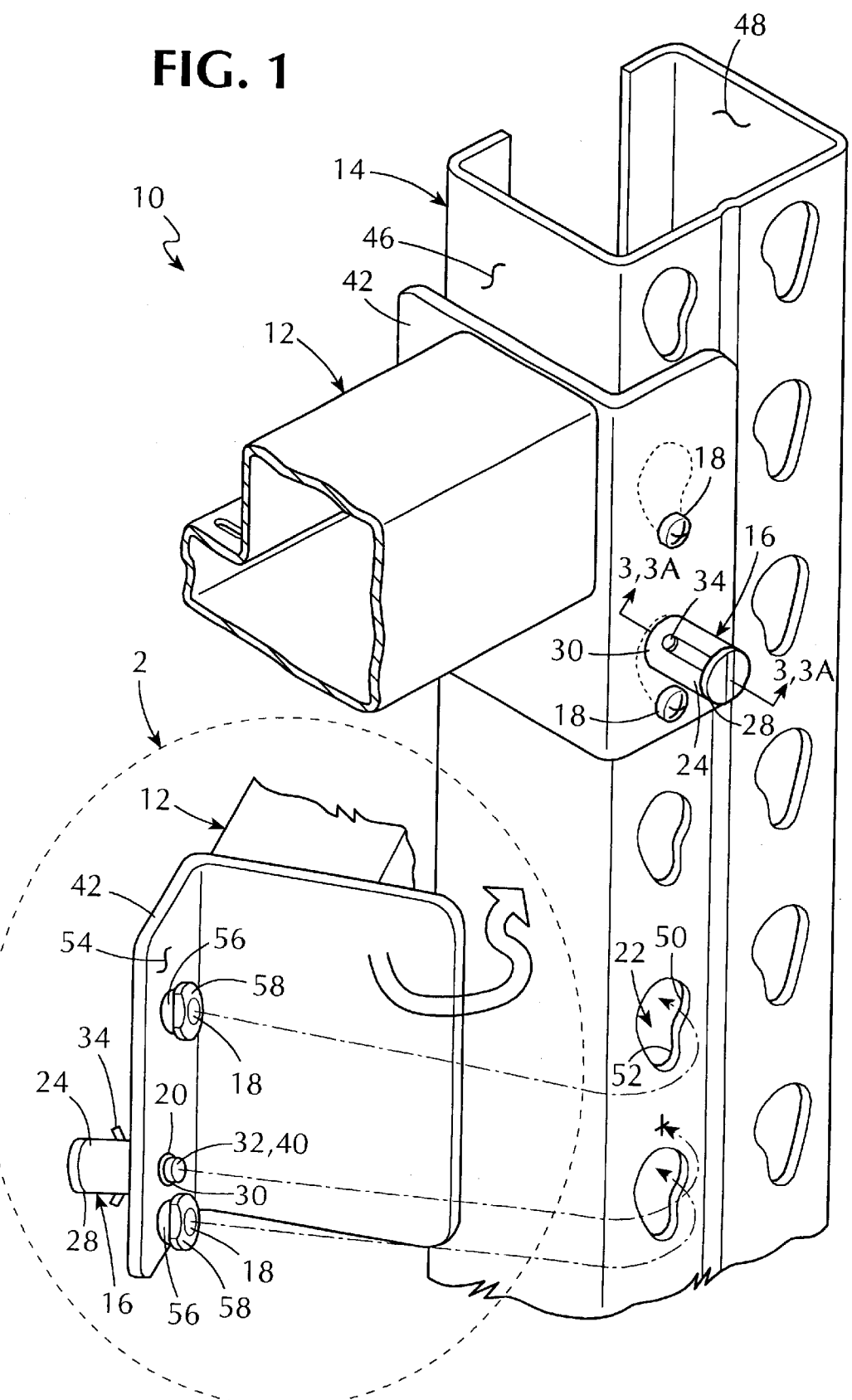
FIG. 1 is a diagrammatic perspective view of the adjustable storage system of the present invention.

LIST OF REFERENCE NUMERALS UTILIZED IN THE DRAWING 10 adjustable storage system of present invention
12 first frame component
14 second frame component
16 lock
18 at least one stud of first frame component 12
20 throughbore in first frame component 12
22 at least one throughslot in second frame component 14
24 housing of lock 16
26 locking pin of lock 16
28 proximal end of housing 24 of lock 16
30 distal end of housing 24 of lock 16
32 shaft of locking pin 26 of lock 16
34 head of locking pin 26 of lock 16
36 spring of locking pin 26 of lock 16
38 proximal end of shaft 32 of locking pin 26 of lock 16
40 distal end of shaft 32 of locking pin 26 of lock 16
42 end connector of first frame component 12
44 edge defining throughbore 20 in first frame component 12
46 outer surface of second frame component 14
48 inner surface of second frame component 14
50 upper portion of at least one throughslot 22 in second frame component 14
52 lower portion of at least one throughslot 22 in second frame component 14
54 outer surface of end connector 42 of first frame component 12
56 shaft of at least one stud 18 of first frame component 12
58 head of at least one stud 18 of first frame component 12
64 inner surface of housing 24 of lock 16
66 cavity contained in housing 24 of lock 16
68 cap of housing 24 of lock 16
70 at least one slot in cap 68 of housing 24 of lock 16 facilitating threading and unthreading cap 68 of housing 24 of lock 16
72 longitudinal wall of housing 24 of lock 16
74 pair of throughslots in housing 24 of lock 16
75 tab extending radially inwardly from edge 44 defining throughbore 20 in end connector 42 of first frame connector 12
76 proximal end of spring 36 of locking pin 26
77 arcuate-shaped member of locking pin 26
78 distal end of spring 36 of locking pin 26
79 D-ring of locking pin 26

DETAILED DESCRIPTION OF THE PREFERRED EMBODIMENT

Figure 2:
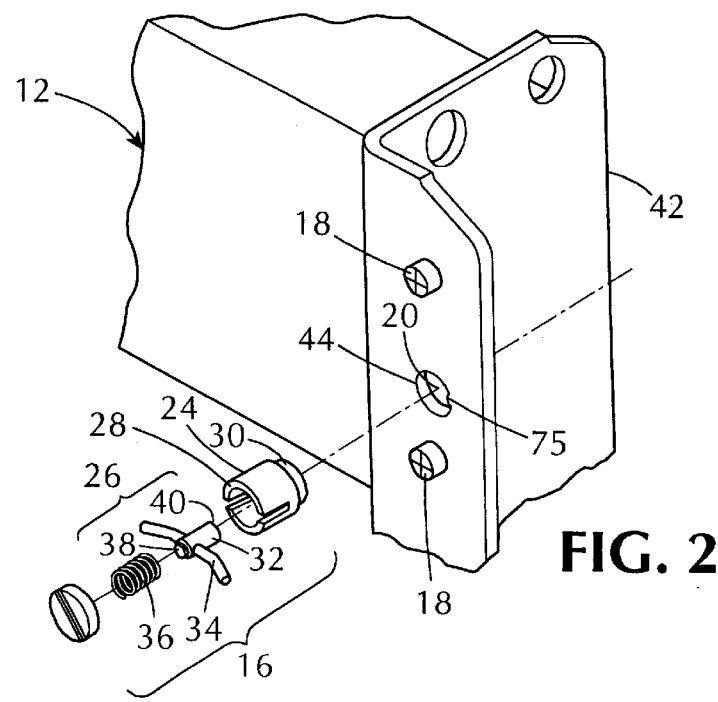
FIG. 2 is an exploded diagrammatic perspective view of the area generally enclosed by the dotted curve identified by ARROW 2 in FIG. 1 of the lock and the end connector of the adjustable storage system of the present invention shown in FIG. 1.

Referring now to the figures, in which like numerals indicate like parts, and particularly to FIGS. 1 and 2, which are, respectively, a diagrammatic perspective view of the adjustable storage system of the present invention, and an exploded diagrammatic perspective view of the area generally enclosed by the dotted curve identified by ARROW 2 in FIG. 1 of the lock and the end connector of the adjustable storage system of the present invention shown in FIG. 1, the adjustable storage system of the present invention is shown generally at 10.

The adjustable storage system 10 comprises a first frame component 12, a second frame component 14, and a lock 16. The first frame component 12 has at least one stud 18 and a throughbore 20, and the second frame component 14 has at least one throughslot 22. The at least one throughslot 22 in the second frame component 14 receives the at least one stud 18 of the first frame component 12, respectively, so as to define a location where the first frame component 12 is linked to the second frame component 14. The first frame component 12 and the second frame component 14 are unlinked from each other by disengaging the at least one stud 18 of the first frame component 12 from the at least one throughslot 22 in the second frame component 14, respectively.

The first frame component 12 is a horizontal member and the second frame component 14 is a vertical member. Alternatively, the first frame component 12 is a horizontal member and the second frame component 14 is a horizontal member.

The lock 16 is attached to the first frame component 12, but is spaced-apart from the at least one stud 18 of the first frame component 12. The lock 16 has a housing 24 and a locking pin 26. The housing 24 of the lock 16 extends into the throughbore 20 in the first frame component 12, and has a proximal end 28 and a distal end 30. The locking pin 26 of the lock 16 has a shaft 32, a head 34, and a spring 36.

The shaft 32 of the locking pin 26 is positioned within the housing 24 of the lock 16, and is movable between an extended position and a retracted position. The shaft 32 of the locking pin 26 has a proximal end 38 and a distal end 40 that extends into one throughslot of the at least one throughslot 22 in the second frame component 14 when the shaft 32 of the locking pin 26 is in the extended position thereof, but does not extend into the one throughslot of the at least one throughslot 22 in the second frame component 14 when the shaft 32 of the locking pin 26 is in the retracted position thereof.

The head 34 of the locking pin 26 is joined to the proximal end 38 of the shaft 32, and extends radially through the housing 24 of the lock 16, and is never outside the proximal end 28 of the housing 24 when the shaft 32 of the locking pin 26 is in the extended position thereof and the retracted position thereof. The spring 36 of the locking pin 26 is joined between the head 34 of the locking pin 26 and the housing 24 of the lock 16, and biases the shaft 32 of the locking pin 26 into the extended position thereof so as to allow the distal end 40 of the shaft 32 to extend outside the distal end 30 of the housing 24.

The first frame component 12 further has an end connector 42. The end connector 42 of the first frame component 12 has the lock 16 attached thereto, and is affixed to the first frame component 12, but is replaceably attachable to the second frame component 14 so as to join the first frame component 12 to the second frame component 14. The end connector 42 of the first frame component 12 further has the at least one stud 18 thereon that is inserted into the at least one throughslot 22 in the second frame component 14, respectively, to attach the first frame component 12 to the second frame component 14 in a linked configuration at a desired location. The end connector 42 of the first frame component 12 further has the throughbore 20 of the first frame component 12 therein, which is defined by an edge 44 that is sized to receive the distal end 30 of the housing 24.

The second frame component 14 is tubular, and has a generally square lateral cross section, an outer surface 46, and an inner surface 48. The outer surface 46 of the second frame component 14 is spaced-apart from the inner surface 48 of the second frame component 14 by a wall thickness.

The at least one throughslot 22 in the second frame component 14 is teardrop shaped, and has an upper portion 50 with a diameter and a lower portion 52 with a diameter. The upper portion 50 of the at least one throughslot 22 is connected to the lower portion 52 of the at least one throughslot 22, respectively, with the diameter of the lower portion 52 of the at least one throughslot 22 being smaller than the diameter of the upper portion 50 of the at least one throughslot 22, respectively.

The end connector 42 of the first frame component 12 has an outer surface 54 and the at least one stud 18 has a shaft 56 with a length and a head 58. The shaft 56 of the at least one stud 18 extends from the outer surface 54 of the end connector 42, with the length of the shaft 56 of the at least one stud 18 being generally greater than the wall thickness of the second frame component 14. The head 58 of the at least one stud 18 is joined to the shaft 56 of the at least one stud 18, and has a truncated circular shape and a diameter. The diameter of the head 58 of the at least one stud 18 is smaller than the diameter of the upper portion 50 of the at least one throughslot 22 in the second frame component 14, but is larger than the diameter of the lower portion 52 of the at least one throughslot 22 in the second frame component 14 so as to allow for axial insertion of the head 58 of the at least one stud 18 into the upper portion 50 of the at least one throughslot 22 in the second frame component 14, while preventing the head 58 of the at least one stud 18 from axial disengagement from the lower portion 52 of the at least one throughslot 22 in the second frame component 14. Alternatively, the at least one stud 18 of the first frame component 12 is a flat tab and the at least one throughslot 22 in the second frame component 14 is a narrow throughslot.

The first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into a throughslot of the at least one throughslot 22 in the second frame component 14 entered by the at least one stud 18 of the first frame component 12 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position thereof so as to remove the shaft 32 of the locking pin 26 from the throughslot of the at least one throughslot 22 in the second frame component 14 so as to allow removal of the at least one stud 18 of the first frame component 12 from the at least one throughslot 22 in the second frame component 14, respectively, and disengage the first frame component 12 from the second frame component 14.

Alternatively, the first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into another throughslot of the at least one throughslot 22 in the second frame component 14 not entered by the at least one stud 18 of the first frame component 12 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position so as to remove the shaft 32 of the locking pin 26 from the another throughslot of the at least one throughslot 22 in the second frame component 14 so as to allow removal of the at least one stud 18 of the first frame component 12 from the at least one throughslot 22 in the second frame component 14, respectively, and disengage the first frame component 12 from the second frame component 14.

Further alternatively, the second frame component 14 has a throughbore that is separate from the at least one throughslot 22 in the second frame component 14. The first frame component 12 and the second frame component 14 are locked together against disengagement when the at least one stud 18 of the first frame component 12 and the at least one throughslot 22 in the second frame component 14 are in the linked configuration and the shaft 32 of the locking pin 26, when in the extended position thereof, extends into the throughbore in the second frame component 14 so as to prevent movement of the at least one stud 18 of the first frame component 12 sufficient for disengagement of the at least one stud 18 of the first frame component 12 from the at least one throughslot 22 in the second frame component 14, respectively. The first frame component 12 and the second frame component 14 are unlocked from each other by moving the shaft 32 of the locking pin 26 to the retracted position thereof so as to remove the shaft 32 of the locking pin 26 from the throughbore in the second frame component 14 so as to allow removal of the at least one stud 18 of the first frame component 12 from the at least one throughslot 22 in the second frame component 14, respectively, and disengage the first frame component 12 from the second frame component 14.

Figure 3:
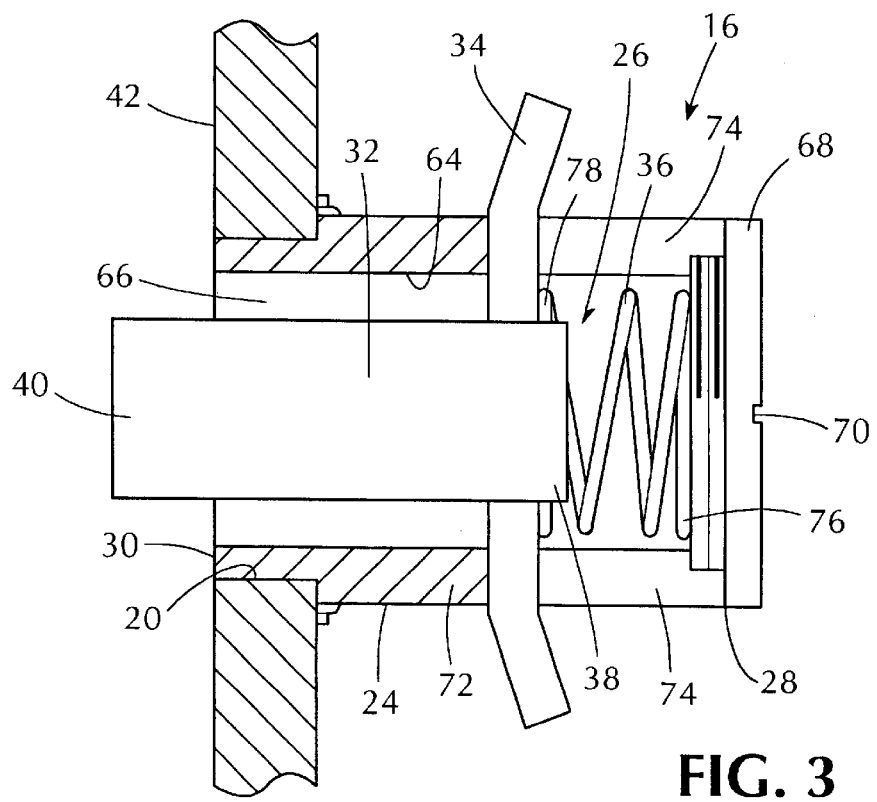
FIG. 3 is an enlarged diagrammatic cross sectional view taken on LINE 3—3 in FIG. 1 of the lock of the adjustable storage system of the present invention shown in FIG. 1.
Figure 3A:
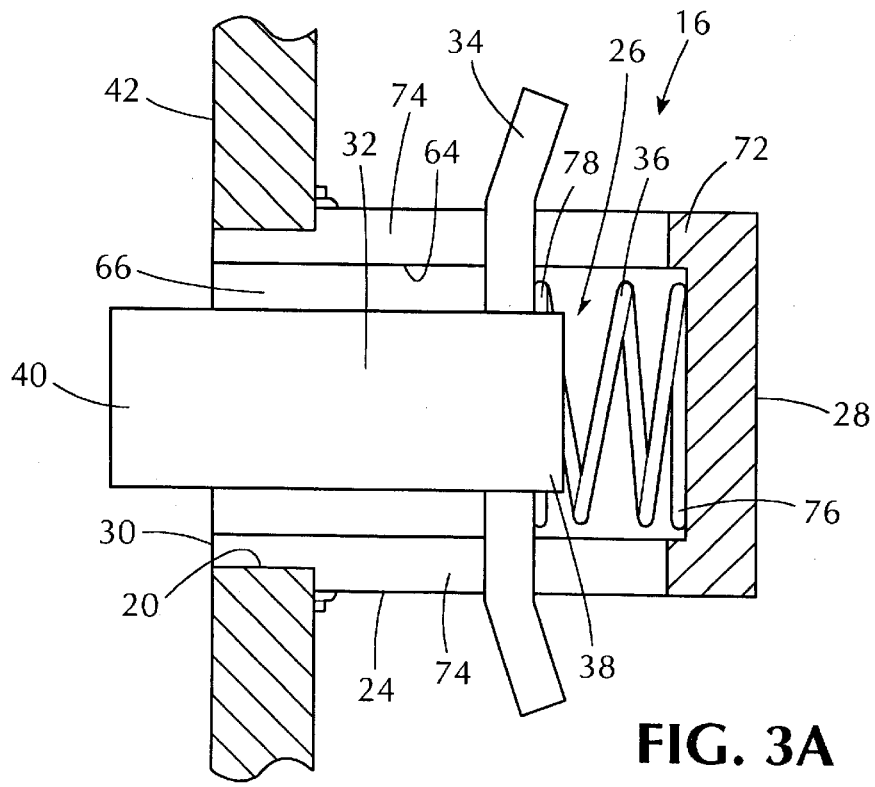
FIG. 3A is an enlarged diagrammatic cross sectional view taken on LINE 3A—3A in FIG. 1 of the lock of the adjustable storage system of the present invention shown in FIG. 1 with modified throughslots in the housing thereof.
Figure 3B:
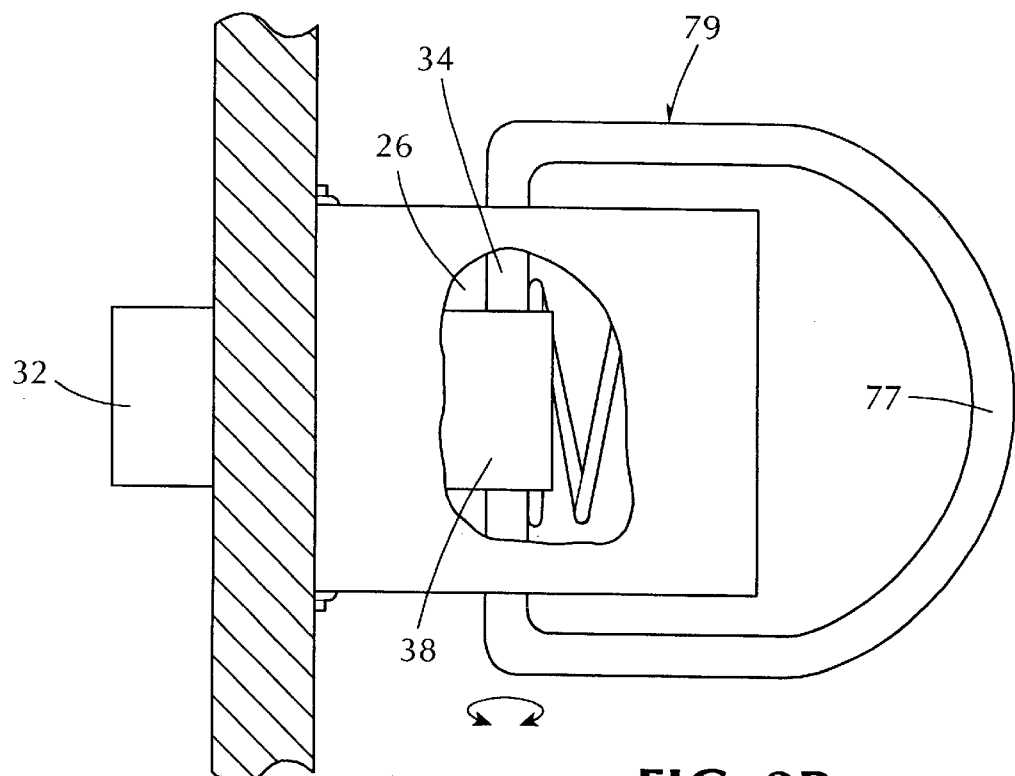
FIG. 3B is a diagrammatic side elevational view of the lock of the adjustable storage system of the present invention shown in FIG. 3A with a modified head.
Figure 4A:
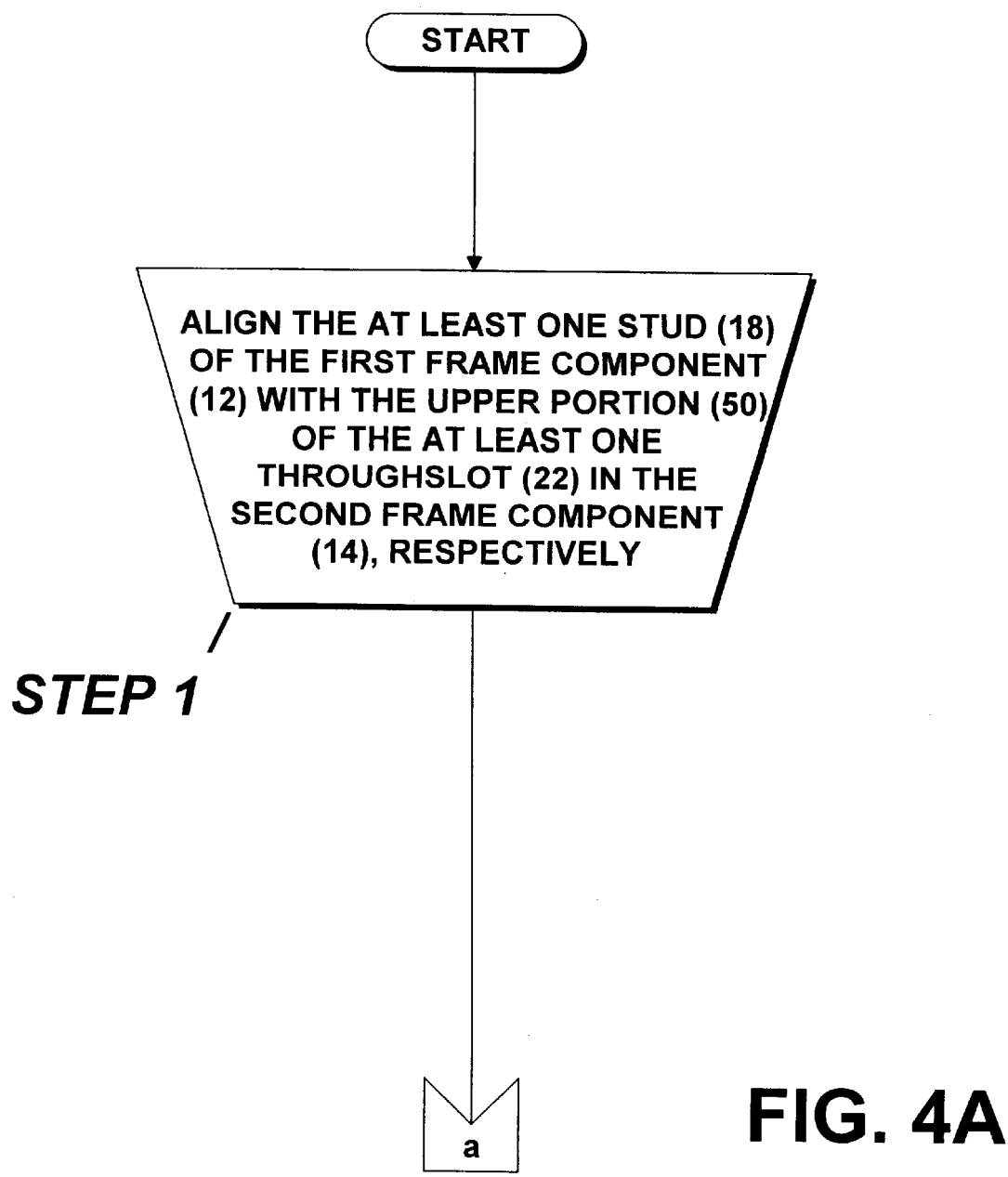
Figure 4B:
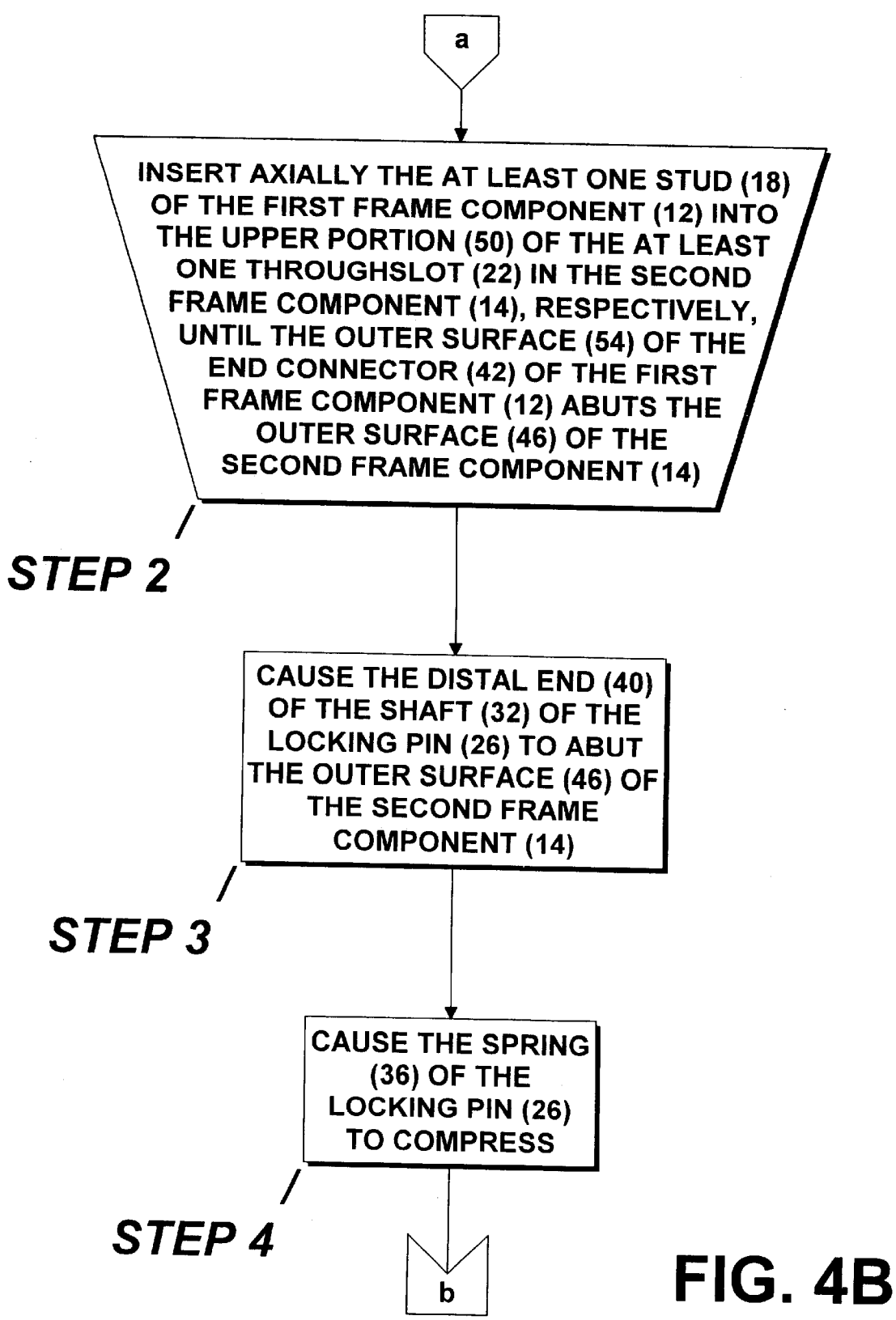
Figure 4C:
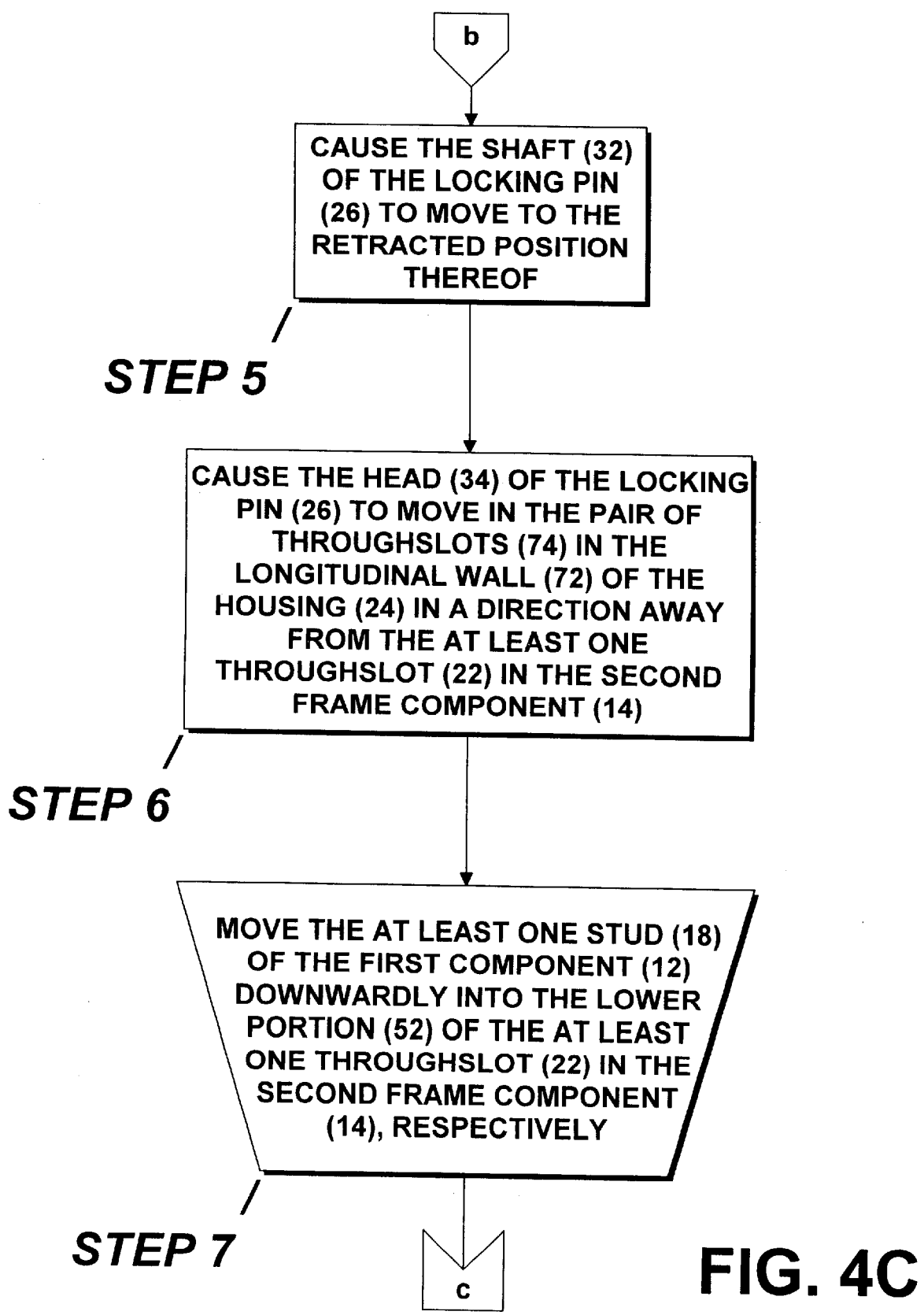
Figure 4E:
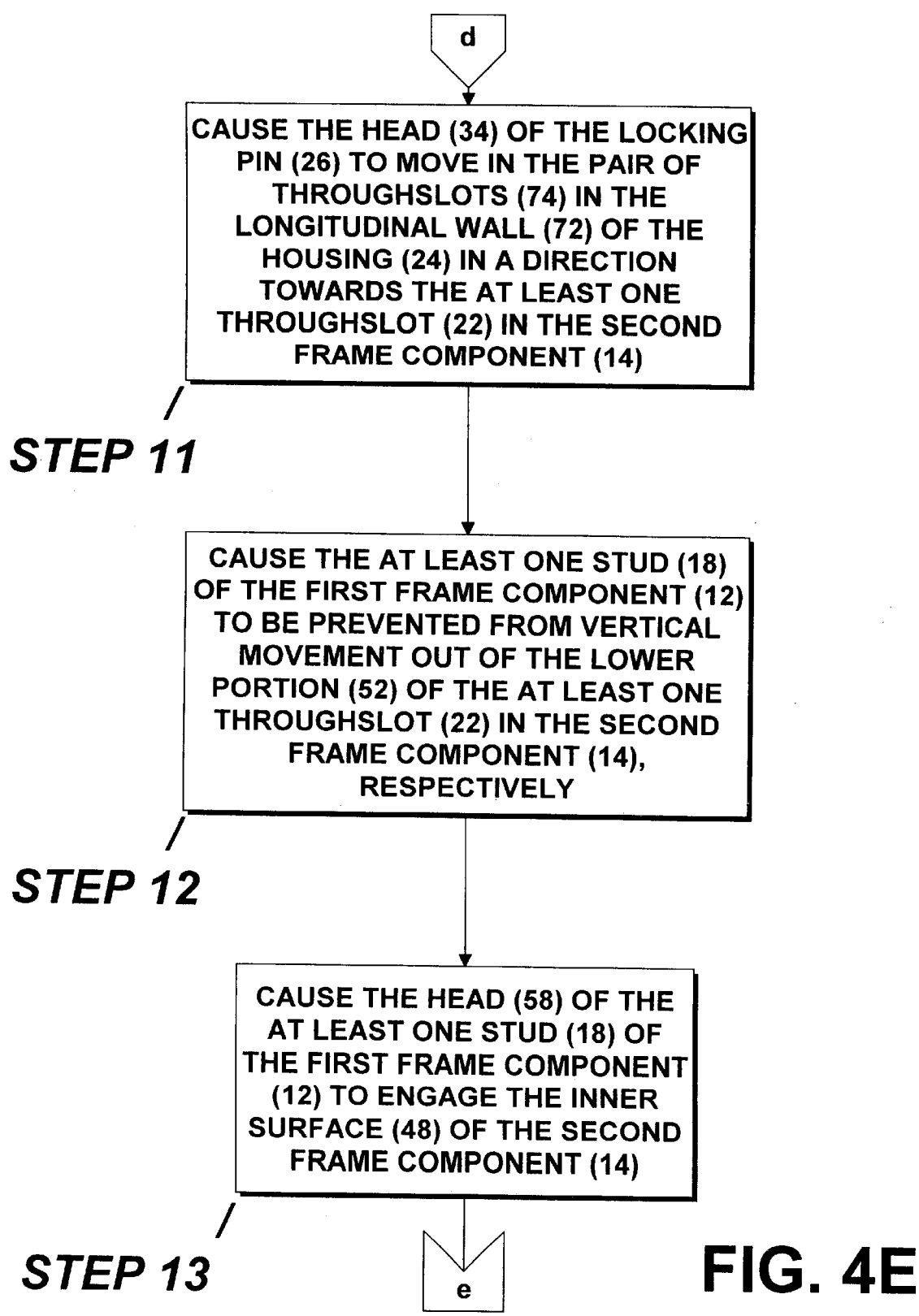
Figure 4F:
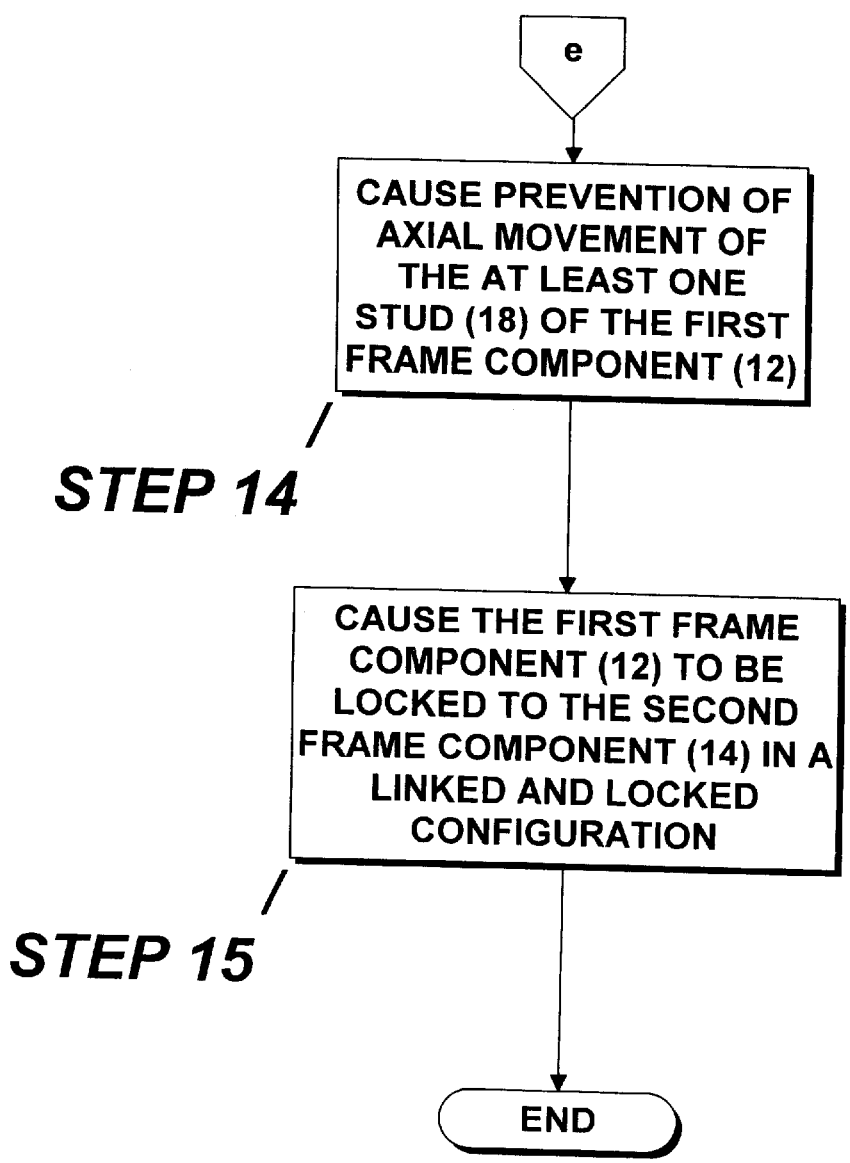
Figure 5B:
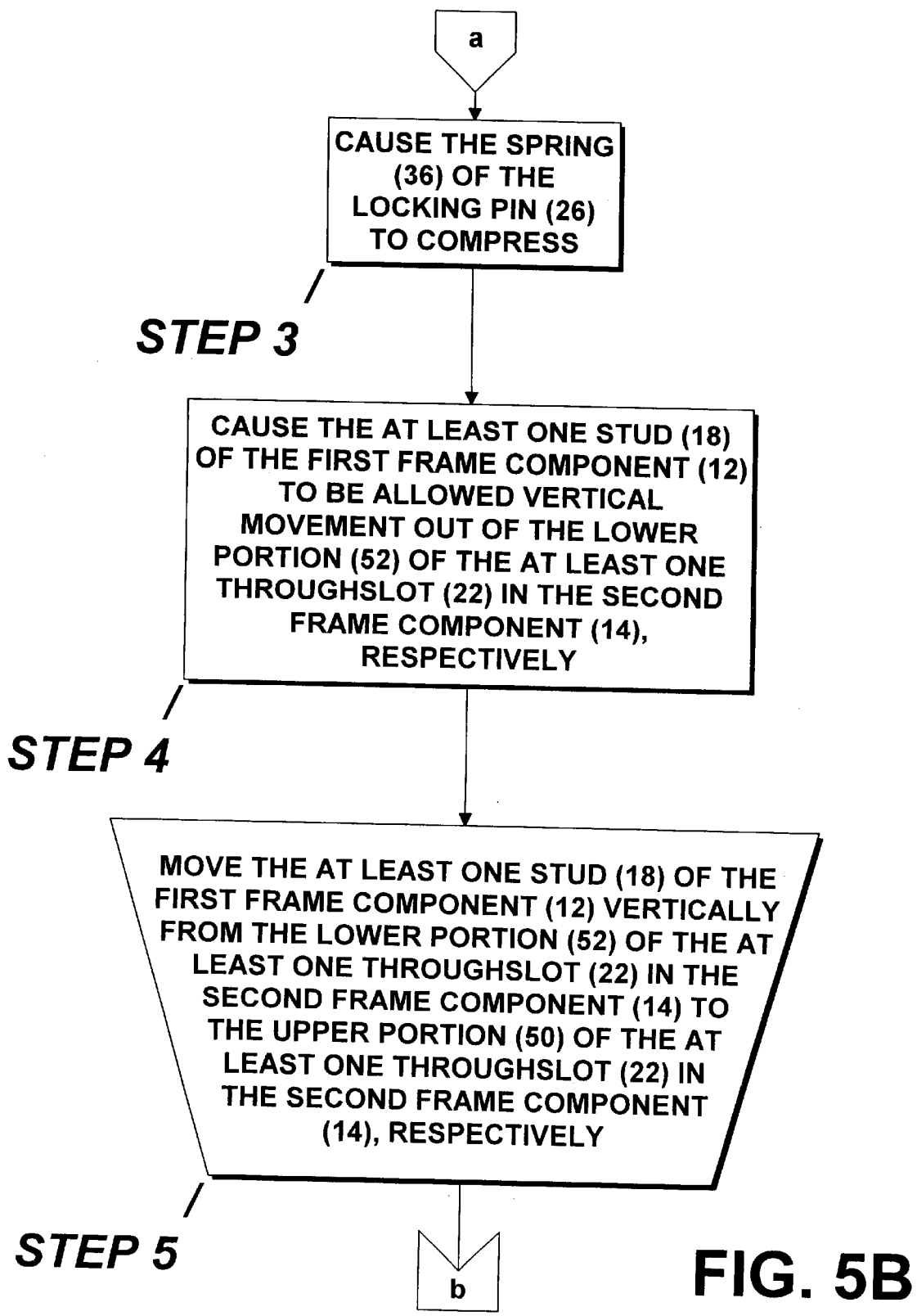
Figure 5C:
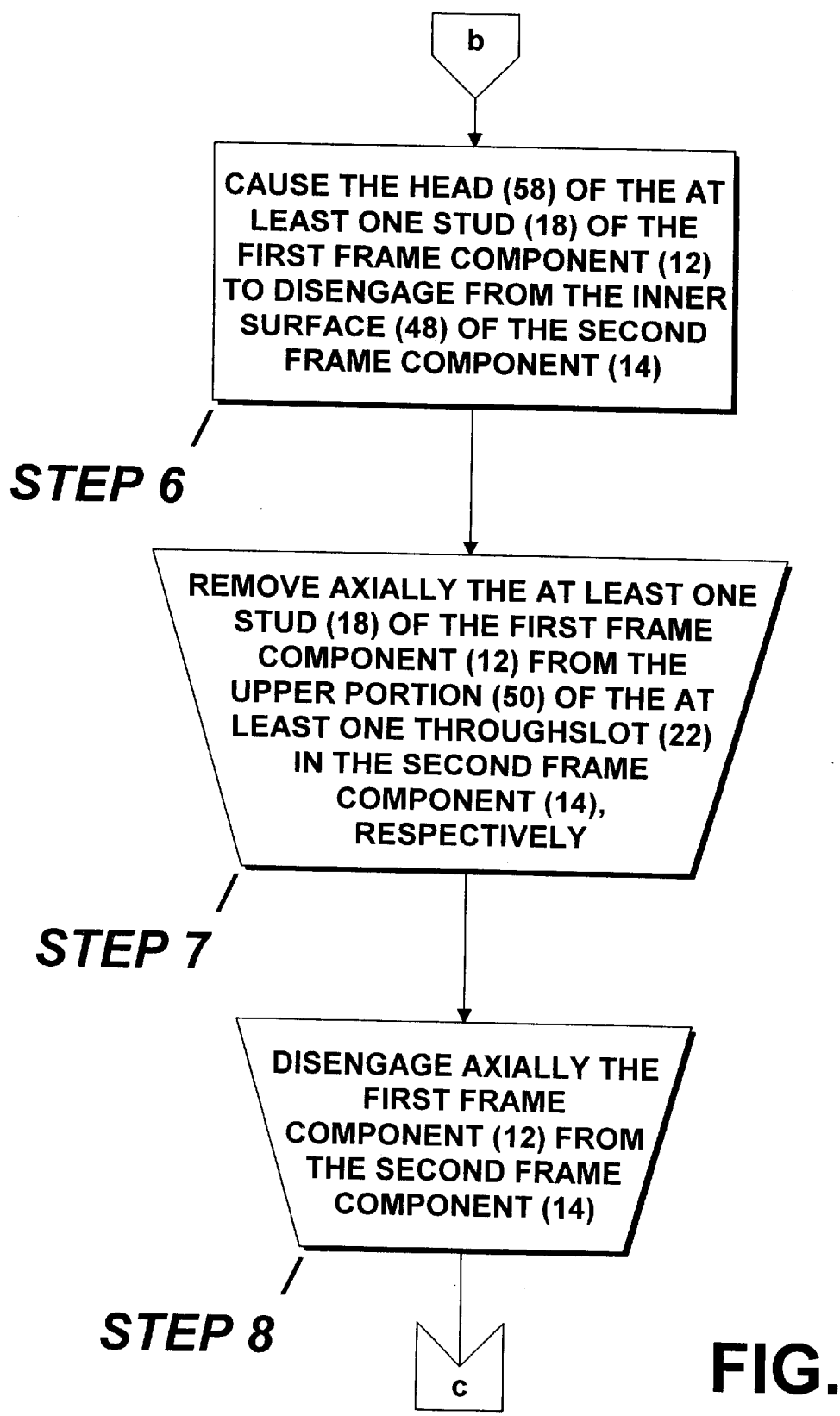
Figure 5D:
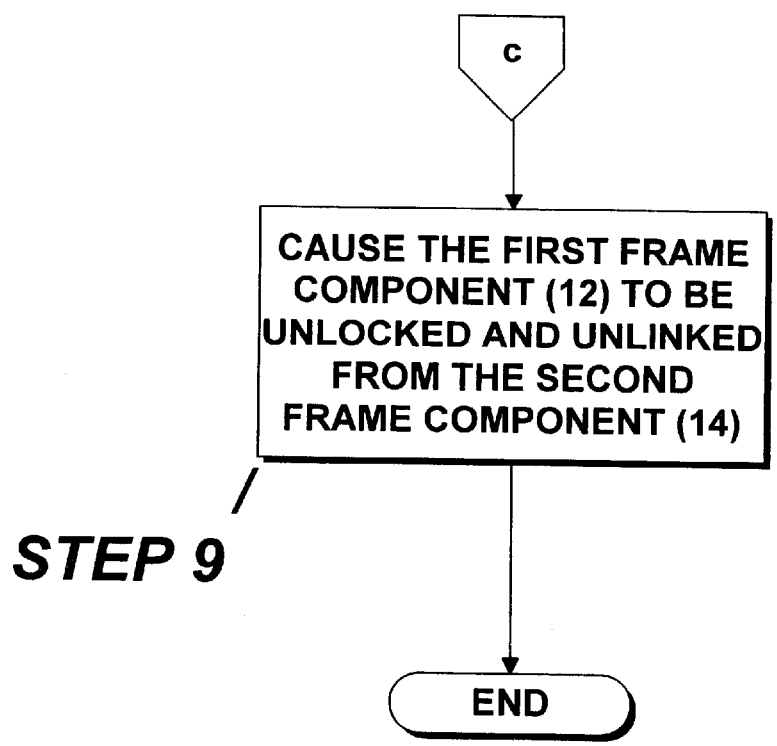

The specific configuration of the lock 16 can best be seen in FIGS. 3, 3A, and 3B, which are, respectively, an enlarged diagrammatic cross sectional view taken on LINE 3—3 in FIG. 1 of the lock of the adjustable storage system of the present invention shown in FIG. 1, an enlarged diagrammatic cross sectional view taken on line 3A—3A in FIG. 1 of the lock of the adjustable storage system of the present invention shown in FIG. 1 with modified throughslots in the housing thereof, and a diagrammatic side elevational view of the lock of the adjustable storage system of the present invention shown in FIG. 3A with a modified head, and as such, will be discussed with reference thereto.

The housing 24 of the lock 16 is cylindrical, has an inner surface 64, and contains a cavity 66 that is cylindrical and defined by the inner surface 64 of the housing 24. The cavity 66 contained in the housing 24 is between the proximal end 28 of the housing 24 and the distal end 30 of the housing 24, and opens to the throughbore 20 in the end connector 42. The proximal end 28 of the housing 24 is open and threaded and the distal end 30 of the housing 24 is open. Alternatively, as shown in FIG. 3A, the proximal end 28 of the housing 24 is closed.

The housing 24 of the lock 16 and the end connector 42 of the first frame component 12 are made of either plastic, a composite material, steel, or aluminum, and are joined together by either a weld, an adhesive, a compression fit, threads, or a press and stake.

The housing 24 further has a cap 68. The cap 68 of the housing 24 engages, and closes, the proximal end 28 of the housing 24, when the proximal end 28 of the housing 24 is open and is threaded so as to threadably engage the proximal end 28 of the housing 24, and has at least one slot 70 therein facilitating threading and unthreading the cap 68 of the housing 24.

The locking pin 26 of the lock 16 is configured to move axially in the housing 24 of the lock 16 and releasably lock the first frame component 12 and the second frame component 14 together when the at least one stud 18 of the first frame component 12 is in the linked configuration with the at least one throughslot 22 in the second frame component 14.

The shaft 32 of the locking pin 26 is cylindrical, slender; and elongated, and has a lateral cross section that is either circular, square, hexagonal, octagonal, or partially rounded.

The proximal end 38 of the shaft 32 is positioned inside the cavity 66 contained in the housing 24 when the shaft 32 of the locking pin 26 is in the extended position thereof and the retracted position thereof. The distal end 40 of the shaft 32 does not protrude from the distal end 30 of the housing 24 when the shaft 32 of the locking pin 26 is in the retracted position thereof or from the cavity 66 contained in the housing 24 when the shaft 32 of the locking pin 26 is in the retracted position thereof, but does protrude from the distal end 30 of the housing 24 when the shaft 32 of the locking pin 26 is in the extended position thereof.

The head 34 of the locking pin 26 is slender and elongated, and is joined to the proximal end 38 of the shaft 32 by either welding, threading, adhering, hot forming, or cold forming.

The housing 24 of the lock 16 further has a longitudinal wall 72 that extends from the proximal end 28 of the housing 24 to the distal end 30 of the housing 24. The head 34 of the locking pin 26 extends radially outwardly, and equidistantly, from opposing sides of the proximal end 38 of the shaft 32, and radially outwardly through the longitudinal wall 72 of the housing 24, and is gripped to move the shaft 32 of the locking pin 26 to the retracted position thereof.

The longitudinal wall 72 of the housing 24 has a pair of throughslots 74. The pair of throughslots 74 in the longitudinal wall 72 of the housing 24 are diametrically opposed to each other, and extend axially along the housing 24 of the lock 16, from, and open into, the proximal end 28 of the housing 24 to short of, and do not open into, the distal end 30 of the housing 24 when the proximal end 28 of the housing 24 is open. Alternatively, as shown in FIG. 3A, the pair of throughslots 74 in the longitudinal wall 72 of the housing 24 extend from, and open into, the distal end 30 of the housing 24 to short of, and do not open into, the proximal end 28 of the housing 24 when the proximal end 28 of the housing 24 is closed. The head 34 of the locking pin 26 extends axially movable, and radially outwardly, through the pair of throughslots 74 in the longitudinal wall 72 of the housing 24, respectively, and together with the housing 24 of the lock 16, are configured to provide a convenient mechanism for grasping the head 34 of the locking pin 26 and moving the shaft 32 of the locking pin 26 to the retracted position thereof without a need for any tools.

Alternatively, as shown in FIG. 3B, the head 34 of the locking pin 26 is pivotally joined through the proximal end 38 of the shaft 32 of the locking pin 26, and the locking pin 26 further has an arcuate-shaped member 77. The arcuate-shaped member 77 of the locking pin 26 is formed with the head 34 of the locking pin 26 so as to form a D-ring 79 therewith. The D-ring 79 of the locking pin 26 is pivotally joined through the proximal end 38 of the shaft 32 of the locking pin 26, by virtue of the head 34 of the locking pin 26 being pivotally joined through the proximal end 38 of the shaft 32 of the locking pin 26, so as to provide a convenient mechanism for grasping and moving the shaft 32 of the locking pin 26 to the retracted position thereof without a need for any tools, and when the D-ring 79 of the locking pin 26 is released, the D-ring 79 of the locking pin 26 pivots downwardly by gravity so as not to be accidently caught upon.

With the distal end 30 of the housing 24 being affixed in the throughbore 20 in the end connector 42, the pair of throughslots 74 in the longitudinal wall 72 of the housing 24 opening into the proximal end 28 of the housing 24 and not opening into the distal end 30 of the housing 24, and the head 34 of the locking pin 26 extending through the pair of throughslots 74 in the longitudinal wall 72 of the housing 24, the cap 68 of the housing 24 being replaceably attached to the proximal end 28 of the housing 24 allows servicing of the locking pin 26 if a malfunction occurs without compromising the structural integrity of the lock 16, and as a result thereof, the lock 16 and the end connector 42 of the first frame component 12 do not have to be scraped.

The throughbore 20 in the first frame component 12 is in the end connector 42 of the first frame connector 12. The edge 44 that defines the throughbore 20 in the end connector 42 has a tab 75 that extends radially inwardly therefrom. The tab 75 in the throughbore 20 in the end connector 42 engages one throughslot of the pair of throughslots 74 in the longitudinal wall 72 of the housing 24 so as to prevent rotation of the housing 24 of the lock 16 relative to the end connector 42 of the first frame connector 12. (See FIG. 2).

The spring 36 of the locking pin 26 is encased within the housing 24 of the lock 16, is positioned to lie compressingly between the head 34 of the locking pin 26 and the cap 68 of the housing 24, and has a proximal end 76 that lies, and engages, against the cap 68 of the housing 24 and a distal end 78 that lies, and engages, against the head 34 of the locking pin 26. The spring 36 of the locking pin 26 is either a metal coil spring, a flat metal spring, a plastic spring, a composite spring, or a compressible material spring.

The housing 24 of the lock 16, the shaft 32 of the locking pin 26, the locking pin 26 of the lock 16, the cavity 66 contained in the housing 24, and the spring 36 of the locking pin 26 are substantially coaxial.

The manner of linking and locking the first frame component 12 to the second frame component 14 can best be seen in FIGS. 4A–4F, which are a process flow chart of the manner of linking and locking the first frame component to the second frame component of of the adjustable storage system of the present invention shown in FIG. 1, and as such, will be discussed with reference thereto.

STEP 1: Align the at least one stud 18 of the first frame component 12 with the upper portion 50 of the at least one throughslot 22 in the second frame component 14, respectively.

STEP 2: Insert axially the at least one stud 18 of the, first frame component 12 into the upper portion 50 of the at least one throughslot 22 in the second frame component 14, respectively, until the outer surface 54 of the end connector 42 of the first frame component 12 abuts the outer surface 46 of the second frame component 14.

STEP 3: Cause the distal end 40 of the shaft 32 of the locking pin 26 to abut the outer surface 46 of the second frame component 14.

STEP 4: Cause the spring 36 of the locking pin 26 to compress.

STEP 5: Cause the shaft 32 of the locking pin 26 to move to the retracted position thereof.

STEP 6: Cause the head 34 of the locking pin 26 to move in the pair of throughslots 74 in the longitudinal wall 72 of the housing 24 in a direction away from the at least one throughslot 22 in the second frame component 14.

STEP 7: Move the at least one stud 18 of the first component 12 downwardly into the lower portion 52 of the at least one throughslot 22 in the second frame component 14, respectively.

STEP 8: Cause the shaft 32 of the locking pin 26 to be aligned with the upper portion 50 of one throughslot of the at least one throughslot 22 in the second frame component 14.

STEP 9: Cause the spring 36 of the locking pin 26 to extend the shaft 32 of the locking pin 26 into the upper portion 50 of the one throughslot of the at least one throughslot 22 in the second frame component 14.

STEP 10: Cause the shaft 32 of the locking pin 26 to automatically achieve the extended position thereof.

STEP 11: Cause the head 34 of the locking pin 26 to move in the pair of throughslots 74 in the longitudinal wall 72 of the housing 24 of the lock 16 in a direction towards the at least one throughslot 22 in the second frame component 14.

STEP 12: Cause the at least one stud 18 of the first frame component 12 to be prevented from vertical movement out of the lower portion 52 of the at least one throughslot 22 in the second frame component 14, respectively.

STEP 13: Cause the head 58 of the at least one stud 18 of the first frame component 12 to engage the inner surface 48 of the second frame component 14.

STEP 14: Cause the prevention of axial movement of the at least one stud 18 of the first frame component 12.

STEP 15: Cause the first frame component 12 to be locked to the second frame component 14 in a linked and locked configuration.

The manner of unlocking and unlinking the first frame component 12 from the second frame component 14 can best be seen in FIGS. 5A–5D, which are a process flow chart of the manner of unlocking and unlinking the first frame component from the second frame component of the adjustable storage system of the present invention shown in FIG. 1, and as such, will be discussed with reference thereto.

STEP 1: Move the head 34 of the locking pin 26 in the pair of throughslots 74 in the longitudinal wall 72 of the housing 24 of the lock 16 in a direction away from the at least one throughslot 22 in the second frame component 14.

STEP 2: Cause the shaft 32 of the locking pin 26 to move to the retracted position thereof.

STEP 3: Cause the spring 36 of the locking pin 26 to compress.

STEP 4: Cause the at least one stud 18 of the first frame component 12 to be allowed vertical movement out of the lower portion 52 of the at least one throughslot 22 in the second frame component 14, respectively.

STEP 5: Move the at least one stud 18 of the first frame component 12 vertically from the lower portion 52 of the at least one throughslot 22 in the second frame component 14 to the upper portion 50 of the at least one throughslot 22 in the second frame component 14, respectively.

STEP 6: Cause the head 58 of the at least one stud 18 of the first frame component 12 to disengage from the inner surface 48 of the second frame component 14.

STEP 7: Remove axially the at least one stud 18 of the first frame component 12 from the upper portion 50 of the at least one throughslot 22 in the second frame component 14, respectively.

STEP 8: Disengage axially the first frame component 12 from the second frame component 14.

STEP 9: Cause the first frame component 12 to be unlocked and unlinked from the second frame component 14.

It will be understood that each of the elements described above, or two or more together, may also find a useful application in other types of constructions differing from the types described above.

While the invention has been illustrated and described as embodied in a lock for preventing inadvertent removal of a first frame component of an adjustable storage system from a second frame component of the adjustable storage system and the adjustable storage system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An adjustable storage system, comprising:
a) a first frame component;
b) a second frame component; and
c) a lock;
wherein said first frame component has at least one stud;
wherein said first frame component has a throughbore;
wherein said second frame component has at least one throughslot;
wherein said at least one throughslot in said second frame component is receivable of said at least one stud of said first frame component, respectively, so as to define a location where said first frame component is linked to said second frame component;
wherein said first frame component and said second frame component are unlinked from each other by disengaging said at least one stud of said first frame component from said at least one throughslot in said second frame component, respectively;
wherein said lock is attached to said first frame component;
wherein said lock has a housing;
wherein said housing of said lock has a proximal end;
wherein said housing of said lock has a distal end;
wherein said distal end of said housing extends into said throughbore in said first frame component;
wherein said lock has a locking pin;
wherein said locking pin of said lock has a shaft;
wherein said shaft of said locking pin is positioned within said housing;

wherein said shaft of said locking pin is movable between an extended position and a retracted position;

wherein said shaft of said locking pin has a proximal end;

wherein said shaft of said locking pin has a distal end;

wherein said distal end of said shaft extends into said second frame component when said shaft of said locking pin is in said extended position thereof;

wherein said distal end of said shaft does not extend into said second frame component when said shaft of said locking pin is in said retracted position thereof;

wherein said locking pin has a head;

wherein said head of said locking pin is joined to said proximal end of said shaft of said locking pin;

wherein said head of said locking pin extends radially through said housing, and is never outside said proximal end of said housing when said shaft of said locking pin is in said extended position thereof and said retracted position thereof;

wherein said locking pin has a spring;

wherein said spring of said locking pin is joined between said head of said locking pin and said housing of said lock; and wherein said spring of said locking pin biases said shaft of said locking pin into said extended position thereof so as to allow said distal end of said shaft to extend outside said distal end of said housing.

2. The system as defined in claim 1, wherein said first frame component has an end connector;

wherein said end connector of said first frame component is affixed to said first frame component;

wherein said lock is attached to said end connector of said first frame component;

wherein said lock is spaced-apart from said at least one stud of said first frame component;

wherein said end connector of said first frame component is replaceably attachable to said second frame component so as to join said first frame component to said second frame component;

wherein said end connector of said first frame component has said at least one stud thereon that is inserted into said at least one throughslot in said second frame component, respectively, to attach said first frame component to said second frame component in a linked configuration at a desired location;

wherein said end connector of said first frame component has said throughbore therein;

wherein said throughbore in said end connector is defined by an edge; and wherein said edge defining said throughbore in said end connector is sized to receive said distal end of said housing.

3. The system as defined in claim 2, wherein said housing of said lock is made of a material selected from the group consisting of plastic, a composite material, steel, and aluminum; and wherein said end connector of said first frame component is made of a material selected from the group consisting of plastic, a composite material, steel, and aluminum.

4. The system as defined in claim 2, wherein said housing of said lock and said end connector of said first frame component are joined together by a joiner selected from the group consisting of a weld, an adhesive, a compression fit, threads, and a press and stake.

5. The system as defined in claim 2, wherein said housing of said lock contains a cavity;

wherein said housing of said lock has an inner surface;

wherein said inner surface of said housing defines said cavity contained in said housing;

wherein said cavity contained in said housing is between said proximal end of said housing and said distal end of said housing; and wherein said cavity contained in said housing opens to said throughbore in said end connector of said first frame component.

6. The system as defined in claim 5, wherein said cavity contained in said housing is cylindrical.

7. The system as defined in claim 5, wherein said housing of said lock, said locking pin of said lock, said spring of said locking pin, said shaft of said locking pin, and said cavity contained in said housing are substantially coaxial.

8. The system as defined in claim 5, wherein said proximal end of said shaft of said locking pin is positioned inside said cavity contained in said housing when said shaft of said locking pin is in said extended position thereof and said retracted position thereof;

wherein said distal end of said shaft of said locking pin does not protrude from said distal end of said housing when said shaft of said locking pin is in said retracted position thereof;

wherein said distal end of said shaft of said locking pin protrudes from said cavity contained in said housing when said shaft of said locking pin is in said extended position thereof; and wherein said distal end of said shaft of said locking pin protrudes from said distal end of said housing when said shaft of said locking pin is in said extended position thereof.

9. The system as defined in claim 2, wherein said housing has a cap;

wherein said cap of said housing engages said proximal end of said housing; and wherein said cap of said housing closes said proximal end of said housing.

10. The system as defined in claim 9, wherein said cap of said housing is threaded;

wherein said proximal end of said housing is threaded; and wherein said cap of said housing threadably engages said proximal end of said housing.

11. The system as defined in claim 9, wherein said cap of said housing has at least one slot therein facilitating threading and unthreading said cap of said housing.

12. The system as defined in claim 9, wherein said spring of said locking is encased within said housing of said lock; and wherein said spring of said locking pin is positioned to lie between said head of said locking pin and said cap of said housing.

13. The system as defined in claim 9, wherein said spring of said locking pin has a proximal end;

wherein said proximal end of said spring lies against said cap of said housing;

wherein said spring of said locking pin has a distal end; and wherein said distal end of said spring lies against said head of said locking pin.

14. The system as defined in claim 9, wherein said spring of said locking pin engages said cap of said housing; and wherein said spring of said locking pin is compressed between said head of said locking pin and said cap of said housing.

15. The system as defined in claim 9, wherein said head of said lock has a longitudinal wall;
   wherein said longitudinal wall of said housing extends from said proximal end of said housing to said distal end of said housing; and
   wherein said head of said locking pin extends radially outwardly through said longitudinal wall of said housing.

16. The system as defined in claim 15, wherein said housing of said lock has a pair of throughslots;
   wherein said pair of throughslots extend axially along said longitudinal wall of said housing;
   wherein said pair of throughslots in said longitudinal wall of said housing extend from said proximal end of said housing to short of said distal end of said housing;
   wherein said pair of throughslots in said longitudinal wall of said housing open into said proximal end of said housing; and
   wherein said pair of throughslots in said longitudinal wall of said housing do not open into said distal end of said housing.

17. The system as defined in claim 16, wherein said pair of throughslots in said longitudinal wall of said housing are diametrically opposed to each other.

18. The system as defined in claim 16, wherein said head of said locking pin extends axially movable through said pair of throughslots in said longitudinal wall of said housing, respectively; and
   wherein said head of said locking pin together with said housing of said lock are configured to provide a convenient mechanism for grasping said head of said locking pin and moving said shaft of said locking pin to the retracted position thereof without a need for any tools.

19. The system as defined in claim 16, wherein said cap of said housing being replaceably attached to said proximal end of said housing allows servicing of said locking pin of said lock if a malfunction occurs without compromising the structural integrity of said lock, and as a result thereof, said lock and said end connector do not have to be scraped.

20. The system as defined in claim 16, wherein said throughbore in said first frame component is in said end connector of said first frame connector;
   wherein said edge that defines said throughbore in said end connector of said first frame connector has a tab;
   wherein said tab of said edge that defines said throughbore in said end connector extends radially inwardly from said edge that defines said throughbore in said end connector; and
   wherein said tab of said edge that defines said throughbore in said end connector engages one throughslot of said pair of throughslots in said longitudinal wall of said housing so as to prevent rotation of said housing of said lock relative to said end connector of said first frame connector.

21. The system as defined in claim 1, wherein said second frame component is tubular;
   wherein said second frame component has a generally square lateral cross section;
   wherein said second frame component has an outer surface;
   wherein said second frame component has an inner surface; and
   wherein said outer surface of said second frame component is spaced-apart from said inner surface of said second frame component by a wall thickness.

22. The system as defined in claim 21, wherein said end connector of said first frame component has an outer surface;
   wherein said at least one stud of said first frame component has a shaft;
   wherein said shaft of said at least one stud extends from said outer surface of said end connector;
   wherein said shaft of said at least one stud has a length;
   wherein said length of said shaft of said at least one stud is generally greater than said wall thickness of said second frame component;
   wherein said at least one stud has a head;
   wherein said head of said at least one stud is joined to said shaft of said at least one stud;
   wherein said head of said at least one stud has a diameter; and
   wherein said diameter of said head of said at least one stud is smaller than said diameter of said upper portion of said at least one throughslot in said second frame component, but is larger than said diameter of said lower portion of said at least one throughslot in said second frame component so as to allow for axial insertion of said head of said at least one stud into said upper portion of said at least one throughslot in said second frame component, while preventing said head of said at least one stud from axial disengagement from said lower portion of said at least one throughslot in said second frame component.

23. The system as defined in claim 1, wherein said at least one throughslot in said second frame component is teardrop shaped;
   wherein said at least one throughslot in said second frame component has an upper portion;
   wherein said upper portion of said at least one throughslot in said second frame component has a diameter;
   wherein said at least one throughslot in said second frame component has a lower portion;
   wherein said lower portion of said at least one throughslot in said second frame component has a diameter;
   wherein said upper portion of said at least one throughslot in said second frame component is connected to said lower portion of said at least one throughslot in said second frame component, respectively; and
   wherein said diameter of said lower portion of said at least one throughslot in said second frame component is smaller than said diameter of said upper portion of said at least one throughslot in said second frame component, respectively.

24. The system as defined in claim 1, wherein said first frame component is a horizontal member; and
   wherein said second component is a vertical member.

25. The system as defined in claim 1, wherein said housing of said lock is cylindrical.

26. The system as defined in claim 1, wherein said proximal end of said housing is spaced-apart from said distal end of said housing.

27. The system as defined in claim 1, wherein said proximal end of said housing is open; and
   wherein said distal end of said housing is open.

28. The system as defined in claim 1, wherein said locking pin of said lock is configured to move axially in said housing of said lock.

29. The system as defined in claim 1, wherein said locking pin of said lock is configured to releasably lock said first frame component and said second frame component together when said at least one stud of said first frame component is in the linked configuration with said at least one throughslot in said second frame component.

30. The system as defined in claim 1, wherein said shaft of said locking pin extends into a throughslot of said at least one throughslot in said second frame component entered by a stud of said at least one stud of said first frame component when said shaft of said locking pin is in said extended position thereof.

31. The system as defined in claim 1, wherein said first frame component and said second frame component are locked together against disengagement when said at least one stud of said first frame component and said at least one throughslot in said second frame component are in a linked configuration and said shaft of said locking pin extends into said at least one throughslot in said second frame component so as to prevent movement of said at least one stud of said first frame component sufficient for disengagement of said at least one stud of said first frame component from said at least one throughslot in said second frame component, respectively; and wherein said first frame component and said second frame component are unlocked from each other by moving said shaft of said locking pin to said retracted position thereof so as to remove said shaft of said locking pin from said at least one throughslot in said second frame component so as to allow removal of said at least one stud of said first frame component from said at least one throughslot in said second frame component, respectively, and disengage said first frame component from said second frame component.

32. The system as defined in claim 1, wherein said first frame component and said second frame component are locked together against disengagement when said at least one stud of said first frame component and said at least one throughslot in said second frame component are in a linked configuration and said shaft of said locking pin extends into another throughslot of said at least one throughslot in said second frame component not entered by said at least one stud of said first frame component so as to prevent movement of said at least one stud of said first frame component sufficient for disengagement of said at least one stud of said first frame component from said at least one throughslot in said second frame component, respectively; and wherein said first frame component and said second frame component are unlocked from each other by moving said shaft of said locking pin to said retracted position so as to remove said shaft of said locking pin from said another throughslot of said at least one throughslot in said second frame component so as to allow removal of said at least one stud of said first frame component from said at least one throughslot in said second frame component, respectively, and disengage said first frame component from said second frame component.

33. The system as defined in claim 1, wherein said second frame component has a throughbore;

wherein said throughbore in said second frame component is separate from said at least one throughslot in said second frame component;

wherein said first frame component and said second frame component are locked together against disengagement when said at least one stud of said first frame component and said at least one throughslot in said second frame component are in a linked configuration and said shaft of said locking pin extends into said throughbore in said second frame component so as to prevent movement of said at least one stud of said first frame component sufficient for disengagement of said at least one stud of said first frame component from said at least one throughslot in said second frame component, respectively; and wherein said first frame component and said second frame component are unlocked from each other by moving said shaft of said locking pin to said retracted position thereof so as to remove said shaft of said locking pin from said throughbore in said second frame component so as to allow removal of said at least one stud of said first frame component from said at least one throughslot in said second frame component, respectively, and disengage said first frame component from said second frame component.

34. The system as defined in claim 1, wherein said spring of said locking pin is of a type selected from the group consisting of a metal coil spring, a flat metal spring, a plastic spring, a composite spring, and a compressible material spring.

35. The system as defined in claim 1, wherein said shaft of said locking pin is cylindrical;

wherein said shaft of said locking pin is slender; and wherein said shaft of said locking pin is elongated.

36. The system as defined in claim 1, wherein said shaft of said locking pin has a lateral cross section selected from the group consisting of circular, square, hexagonal, octagonal, and partially rounded.

37. The system as defined in claim 1, wherein said head of said locking pin is gripped to move said shaft of said locking pin t o said retracted position thereof.

38. The system as defined in claim 1, wherein said head of said locking pin is slender; and wherein said head of said locking pin is elongated.

39. The system as defined in claim 1, wherein said head of said locking pin is joined to said proximal end of said shaft by joiner selected from the group consisting of welding, threading, adhering, hot forming, and cold forming.

40. The system as defined in claim 1, wherein said head of said locking pin extends radially outwardly from said proximal end of said shaft.

41. The system as defined in claim 1, wherein said head of said locking pin extends radially outwardly from opposing sides of said proximal end of said shaft.

42. The system as defined in claim 1, wherein said head of said locking pin extends equidistantly from opposing sides of said proximal end of said shaft.

43. The system as defined in claim 1, wherein said proximal end of said housing is closed; and wherein said distal end of said housing is open.

44. The system as defined in claim 1, wherein said housing of said lock has a longitudinal wall;

wherein said longitudinal wall of said housing extends from said proximal end of said housing to said distal end of said housing; and wherein said head of said locking pin extends radially outwardly through said longitudinal wall of said housing.

45. The system as defined in claim 44, wherein said housing of said lock has a pair of throughslots;

wherein said pair of throughslots extend axially along said longitudinal wall of said housing;

wherein said pair of throughslots in said longitudinal wall of said housing extend from said distal end of said housing to short of said proximal end of said housing;

wherein said pair of throughslots in said longitudinal wall of said housing open into said distal end of said housing; and wherein said pair of throughslots in said longitudinal wall of said housing do not open into said proximal end of said housing.

46. The system as defined in claim 1, wherein said head of said locking pin is pivotally joined through said proximal end of said shaft of said locking pin;

wherein said locking pin has an arcuate-shaped member;

wherein said arcuate-shaped member of said locking pin is formed with said head of said locking pin so as to form a D-ring therewith;

wherein said D-ring of said locking pin is pivotally joined through said proximal end of said shaft of said locking pin, by virtue of said head of said locking pin being pivotally joined through said proximal end of said shaft of said locking pin, so as to provide a convenient mechanism for grasping and moving said shaft of said locking pin to said retracted position thereof without a need for any tools; and wherein said D-ring of said locking pin pivots downwardly by gravity when said D-ring of said locking pin is released so as not to be accidently caught upon.

47. A lock for preventing inadvertent removal of a first frame component of an adjustable storage system from a second frame component of the adjustable storage system, wherein said first frame component of the adjustable storage system has a throughbore, and wherein the second frame component of the adjustable storage system has a throughbore, said lock comprising:

a) a housing;
b) a locking pin; and
c) a spring;

wherein said housing has a proximal end;

wherein said housing has a distal end;

wherein said distal end of said housing is for extending into the throughbore in the first frame component of the adjustable storage system;

wherein said locking pin has a shaft;

wherein said shaft of said locking pin is movable between an extended position and a retracted position relative to said housing;

wherein said shaft of said locking pin has a proximal end;

wherein said shaft of said locking pin has a distal end;

wherein said distal end of said shaft of said locking pin is for extending into the throughbore in the second frame component of the adjustable storage system when said shaft of said locking pin is in said extended position thereof;

wherein said distal end of said shaft of said locking pin is for not extending into the throughbore in the second frame component of the adjustable storage system when said shaft of said locking pin is in said retracted position thereof;

wherein said locking pin has a head;

wherein said head of said locking pin is joined to said proximal end of said shaft;

wherein said head of said locking pin extends radially through said housing, and is never outside said proximal end of said housing when said shaft of said locking pin is in said extended position thereof and said retracted position thereof;

wherein said spring is joined between said head of said locking pin and said housing; and wherein said spring biases said shaft of said locking pin into said extended position thereof so as to allow said distal end of said shaft of said locking pin to extend outside said distal end of said housing.

48. The lock as defined in claim 47, wherein said housing is cylindrical.

49. The lock as defined in claim 47, wherein said housing is made of a material selected from the group consisting of plastic, a composite material, steel, and aluminum.

50. The lock as defined in claim 47, wherein said housing is for being joined to the first frame component by a joiner selected from the group consisting of a weld, press and stake, and an adhesive.

51. The lock as defined in claim 47, wherein said housing contains a cavity;

wherein said housing has an inner surface;

wherein said inner surface of said housing defines said cavity contained in said housing; and wherein said cavity contained in said housing is between said proximal end of said housing and said distal end of said housing.

52. The lock as defined in claim 51, wherein said cavity contained in said housing is cylindrical.

53. The lock as defined in claim 51, wherein said proximal end of said shaft is positioned inside said cavity contained in said housing when said shaft of said locking pin is in said extended position thereof and said retracted position thereof;

wherein said distal end of said shaft does not protrude from said cavity contained in said housing when said shaft of said locking pin is in said retracted position thereof;

wherein said distal end of said shaft does not protrude from said distal end of said housing when said shaft of said locking pin is in said retracted position thereof;

wherein said distal end of said shaft protrudes from said cavity contained in said housing when said shaft of said locking pin is in said extended position thereof; and wherein said distal end of said shaft protrudes from said distal end of said housing when said shaft of said locking pin is in said extended position thereof.

54. The lock as defined in claim 51, wherein said housing, said locking pin, said spring, said shaft of said locking pin, and said cavity contained in said housing are substantially coaxial.

55. The lock as defined in claim 47, wherein said proximal end of said housing is spaced-apart from said distal end of said housing.

56. The lock as defined in claim 47, wherein said proximal end of said housing is open; and wherein said distal end of said housing is open.

57. The lock as defined in claim 47, wherein said housing has a cap;

wherein said cap of said housing engages said proximal end of said housing; and wherein said cap of said housing closes said proximal end of said housing.

58. The lock as defined in claim 57, wherein said spring is encased within said housing; and wherein said spring is positioned to lie between said head of said locking pin and said cap of said housing.

59. The lock as defined in claim 57, wherein said spring has a proximal end;

wherein said proximal end of said spring lies against said cap of said housing;

wherein said spring has a distal end; and wherein said distal end of said spring lies against said head of said locking pin.

60. The lock as defined in claim 57, wherein said spring engages said cap of said housing; and wherein said spring is compressed between said head of said locking pin and said cap of said housing.

61. The lock as defined in claim 57, wherein said cap of said housing is threaded;

wherein said proximal end of said housing is threaded; and wherein said cap of said housing threadably engages said proximal end of said housing.

62. The lock as defined in claim 57, wherein said cap of said housing has at least one slot therein facilitating threading and unthreading said cap of said housing.

63. The lock as defined in claim 47, wherein said locking pin is configured to move axially in said housing.

64. The lock as defined in claim 47, wherein said spring is of a type selected from the group consisting of a metal coil spring, a flat metal spring, a plastic spring, a composite spring, and a compressible material spring.

65. The lock as defined in claim 47, wherein said shaft of said locking pin is cylindrical;

wherein said shaft of said locking pin is slender; and wherein said shaft of said locking pin is elongated.

66. The lock as defined in claim 47, wherein said shaft of said locking pin has a lateral cross section selected from the group consisting of circular, square, hexagonal, octagonal, and partially rounded.

67. The lock as defined in claim 47, wherein said head of said locking pin is gripped to move said shaft of said locking pin to said retracted position thereof.

68. The lock as defined in claim 47, wherein said head of said locking pin is slender; and wherein said head of said locking pin is elongated.

69. The lock as defined in claim 47, wherein said head of said locking pin is joined to said proximal end of said shaft by a joiner selected from the group consisting of welding, threading, adhering, hot forming, and cold forming.

70. The lock as defined in claim 47, wherein said housing has a longitudinal wall;

wherein said longitudinal wall of said housing extends from said proximal end of said housing to said distal end of said housing; and wherein said head of said locking pin extends radially outwardly through said longitudinal wall of said housing.

71. The lock as defined in claim 70, wherein said housing has a pair of throughslots;

wherein said pair of throughslots extend axially along said longitudinal wall of said housing;

wherein said pair of throughslots in said longitudinal wall of said housing extend from said proximal end of said housing to short of said distal end of said housing;

wherein said pair of throughslots in said longitudinal wall of said housing open into said proximal end of said housing; and wherein said pair of throughslots in said longitudinal wall of said housing do not open into said distal end of said housing.

72. The lock as defined in claim 71, wherein said pair of throughslots in said longitudinal wall of said housing are diametrically opposed to each other.

73. The lock as defined in claim 71, wherein said head of said locking pin extends axially movable through said pair of throughslots in said longitudinal wall of said housing, respectively; and wherein said head of said locking pin together with said housing are configured to provide a convenient mechanism for grasping the head of the locking pin and moving the shaft of the locking pin to the retracted position thereof without a need for any tools.

74. The lock as defined in claim 47, wherein said head of said locking pin extends radially outwardly from said proximal end of said shaft.

75. The lock as defined in claim 47, wherein said head of said locking pin extends radially outwardly from opposing sides of said proximal end of said shaft.

76. The lock as defined in claim 47, wherein said head of said locking pin extends equidistantly from opposing sides of said proximal end of said shaft.

77. The lock as defined in claim 47, wherein said proximal end of said housing is closed; and wherein said distal end of said housing is open.

78. The lock as defined in claims 47, wherein said housing of said lock has a longitudinal wall;

wherein said longitudinal wall of said housing extends from said proximal end of said housing to said distal end of said housing; and wherein said head of said locking pin extends radially outwardly through said longitudinal wall of said housing.

79. The lock as defined in claim 78, wherein said housing of said lock has a pair of throughslots;

wherein said pair of throughslots extend axially along said longitudinal wall of said housing;

wherein said pair of throughslots in said longitudinal wall of said housing extend from said distal end of said housing to short of said proximal end of said housing;

wherein said pair of throughslots in said longitudinal wall of said housing open into said distal end of said housing; and wherein said pair of throughslots in said longitudinal wall of said housing do not open into said proximal end of said housing.

80. The lock as defined in claim 47, wherein said head of said locking pin is pivotally joined through said proximal end of said shaft of said locking pin;

wherein said locking pin has an arcuate-shaped member;

wherein said arcuate-shaped member of said locking pin is formed with said head of said locking pin so as to form a D-ring therewith;

wherein said D-ring of said locking pin is pivotally joined through said proximal end of said shaft of said locking pin, by virtue of said head of said locking pin being pivotally joined through said proximal end of said shaft of said locking pin, so as to provide a convenient mechanism for grasping and moving said shaft of said locking pin to said retracted position thereof without a need for any tools; and wherein said D-ring of said locking pin pivots downwardly by gravity when said D-ring of said locking pin is released so as not to be accidently caught upon.

81. A method of linking and locking a first frame component to a second frame component of an adjustable storage system, wherein the first frame component has at least one stud with a head, and an end connector with an outer surface, wherein the second frame component has at least one throughslot, an outer surface, and an inner surface, wherein the at least one throughslot has an upper portion and a lower portion, wherein the adjustable storage system further has a lock with a housing and a locking pin, wherein the housing has a longitudinal wall with a pair of throughslots, and wherein the locking pin has a head, a spring, and a shaft with a distal end, a retracted position, and an extended position, said method comprising the steps of:

a) aligning the at least one stud of the first frame component with the upper portion of the at least one throughslot in the second frame component, respectively;

b) inserting axially the at least one stud of the first frame component into the upper portion of the at least one throughslot in the second frame component, respectively, until the outer surface of the end connector of the first frame component abuts the outer surface of the second frame component;

c) causing the distal end of the shaft of the locking pin to abut the outer surface of the second frame component;

d) causing the spring of the locking pin to compress;

e) causing the shaft of the locking pin to move to the retracted position thereof;

f) causing the head of the shaft to move in the pair of throughslots in the longitudinal wall of the housing of the lock in a direction away from the at least one throughslot in the second frame component;

g) moving the at least one stud of the first component downwardly into the lower portion of the at least one throughslot in the second frame component, respectively;

h) causing the shaft of the locking pin to be aligned with the upper portion of one throughslot of the at least one throughslot in the second frame component;

i) causing the spring of the locking pin to extend the shaft of the locking pin into the upper portion of the one throughslot of the at least one throughslot in the second frame component;

j) causing the shaft of the locking pin to automatically achieve the extended position thereof, k) causing the head of the locking pin to move in the pair of throughslots in the longitudinal wall of the housing of the lock in a direction towards the at least one throughslot in the second frame component;

l) causing the at least one stud of the first frame component to be prevented from vertical movement out of the lower portion of the at least one throughslot in the second frame component, respectively;

m) causing the head of the at least one stud of the first frame component to engage the inner surface of the second frame component;

n) causing prevention of axial movement of the at least one stud of the first frame component; and o) causing the first frame component to be locked to the second frame component in a linked and locked configuration.

82. A method of unlocking and unlinking a first frame component from a second frame component of an adjustable storage system, wherein the first frame component has at least one stud with a head, wherein the second frame component has at least one throughslot and an inner surface, wherein the at least one throughslot has a lower portion and an upper portion, wherein the adjustable storage system further has a lock with a housing and a locking pin, wherein the housing has a longitudinal wall with a pair of throughslots, and wherein the locking pin has a head, a spring, and a shaft with a retracted position, said method comprising the steps of:

a) moving the head of the locking pin in the pair of throughslots in the longitudinal wall of the housing of the lock in a direction away from the at least one throughslot in the second frame component;

b) causing the shaft of the locking pin to move to the retracted position thereof;

c) causing the spring of the locking pin to compress;

d) causing the at least one stud of the first frame component to be allowed vertical movement out of the lower portion of the at least one throughslot in the second frame component, respectively;

e) moving the at least one stud of the first frame component vertically from the lower portion of the at least one throughslot in the second frame component to the upper portion of the at least one throughslot in the second frame component, respectively;

f) causing the head of the at least one stud of the first frame component to disengage from the inner surface of the second frame component;

g) removing axially the at least one stud of the first frame component from the upper portion of the at least one throughslot in the second frame component, respectively;

h) disengaging axially the first frame component from the second frame component; and i) causing the first frame component to be unlocked and unlinked from the second frame component.

* * * * *